United States Patent [19]

Sugimoto et al.

[11] Patent Number: 4,594,671
[45] Date of Patent: Jun. 10, 1986

[54] VELOCITY METHOD OF CONTROLLING INDUSTRIAL ROBOT ACTUATORS

[75] Inventors: Koichi Sugimoto, Hiratsuka; Kiyohide Koizumi, Tokyo; Toyohide Hamada, Yokohama; Shinichi Arai, Tokyo, all of Japan

[73] Assignee: Hitachi, Ltd., Tokyo, Japan

[21] Appl. No.: 458,998

[22] Filed: Jan. 18, 1983

[30] Foreign Application Priority Data

Feb. 19, 1982 [JP] Japan ............................ 57-24361

[51] Int. Cl.$^4$ ................ G05B 19/407; G05B 11/32; B25J 9/00; G09C 0/00
[52] U.S. Cl. ................................. 364/513; 364/174; 364/551; 364/190; 318/568; 901/3; 901/4
[58] Field of Search .............. 364/513, 551, 565, 566, 364/174, 190, 148; 318/568; 901/3, 4

[56] References Cited

U.S. PATENT DOCUMENTS

| | | | |
|---|---|---|---|
| 3,909,600 | 9/1975 | Hohn | 235/151.1 |
| 3,920,972 | 11/1975 | Corwin, Jr. et al. | 235/151.1 |
| 4,218,172 | 8/1980 | Freund | 364/513 X |
| 4,300,198 | 11/1981 | Davini | 364/513 |
| 4,305,028 | 12/1981 | Kostas et al. | 318/568 X |
| 4,338,672 | 7/1982 | Perzley et al. | 364/513 |
| 4,360,886 | 11/1982 | Kostas et al. | 364/551 |
| 4,435,221 | 6/1984 | Davis et al. | 364/174 X |
| 4,486,693 | 12/1984 | Hamsiti et al. | 364/174 X |
| 4,494,060 | 1/1985 | Chitayat et al. | 364/513 X |
| 4,498,036 | 2/1985 | Salemka | 364/148 X |
| 4,513,381 | 4/1985 | Houser, Jr. et al. | 364/174 X |

OTHER PUBLICATIONS

Whitney, "The Mathematics of Coordinated Control of Prosthetic Arms and Manipulators", *Transactions of ASME, Journal of Dynamic Systems, Measurement and Control*, Paper No. 72-WA/Aut-4, 1973.

Primary Examiner—Jerry Smith
Assistant Examiner—Jon D. Grossman
Attorney, Agent, or Firm—Antonelli, Terry & Wands

[57] ABSTRACT

A method of controlling an industrial robot wherein velocities of the actuators for the robot are based on the velocity of a robot hand moving along a predetermined path of travel. When the velocity of any single actuator exceeds its ability, the velocities of the actuators are revised so as to bring the velocities of all the actuators within their abilities, thereby revising the velocity of the robot hand along its path of travel. Calculation of the velocity of each actuator may be carried out based on the position and posture of the robot hand and a Jacobian matrix.

8 Claims, 3 Drawing Figures

VELOCITY METHOD OF CONTROLLING INDUSTRIAL ROBOT ACTUATORS

BACKGROUND OF THE INVENTION

This invention relates to methods of controlling industrial robots in driving same, and more particularly, it to a method of controlling an industrial robot so as to cause a hand of the industrial robot to move along a predetermined path of travel.

In, for example, U.S. Pat. No. 3,909,600, a method of controlling an industrial robot is proposed wherein interval of taught points taught is interpolated at regular intervals to give an indicated speed to a robot hand, then displacements of actuators for the robot corresponding to the points of interpolation obtained are calculated, and thereafter the displacements of the actuators obtained by the calculation are compared with actual displacements of the actuators to determine any deviations, therein so as to control the driving of the actuators to control the movement of the robot hand. Stated differently, the speeds at which the actuators are to be driven are obtained in dependence upon the indicated speed of the robot hand to thereby drive the robot hand at a predetermined speed along a predetermined path of travel.

In the above proposed control method, the speed at which each actuator is driven is determined in dependence upon the speed of movement of the robot hand. Because of this, the speed at which the actuator is driven might exceed the capability of the actuation depending on the posture of the robot and the robot hand might become inoperative as a result of an error being assumed to have been committed. When this situation occurs, the robot itself would become uncontrollable and could not be driven. This would not only reduce operation efficiency of the robot but would also raise a problem with regard to the quality control of the article handled by the robot or safety management for robot operations.

SUMMARY OF THE INVENTION

This invention has as its object the provision of a method of control of an industrial robot, wherein, when a hand of the robot is to be moved along a predetermined path of travel, the speed of each actuator is revised, if instructions given to the actuators moving the robot hand contain speeds that exceed the capabilities of the actuators, so as to allow the robot hand to move along the predetermined path of travel, thereby enabling the robot hand to move smoothly without interruption.

One outstanding characteristic of the invention is that the velocities of the actuators for the robot are calculated on the velocity of a robot hand moving along a predetermined path of travel, and when the velocity of any single actuator exceeds its capability, the velocities of the actuators are revised so as to bring the velocities of all the actuators within their capabilities thereby revising the velocity of the robot hand moving along the path of travel.

Another outstanding characteristic of the invention is that the velocity of each actuator may be calculated based on the position and posture of the robot hand and a Jacobian matrix.

DETAILED DESCRIPTION

Figure 1:
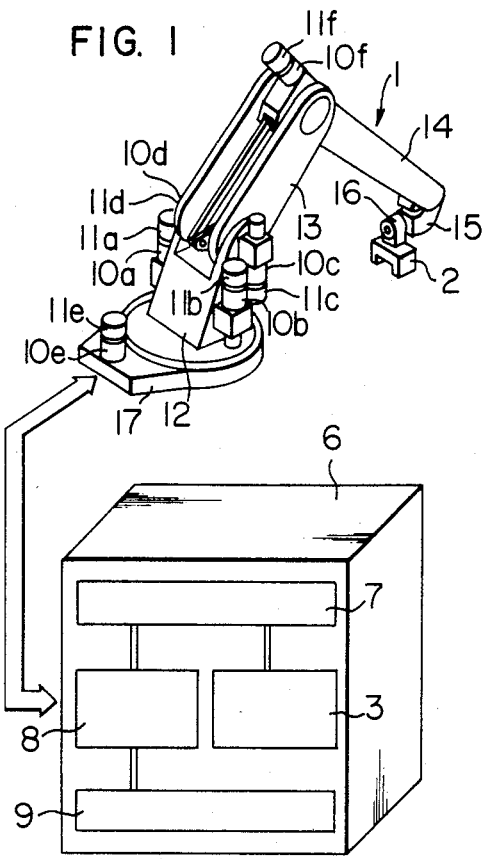
FIG. 1 is a partially schematic perspective view of an industrial robot for which the method of the present invention is intended; and a control apparatus therefor

A preferred embodiment of the invention will now be described by referring to the accompanying drawings. Referring now to the drawings wherein like reference numerals are used throughout the various views to designate like parts and, more particularly, to FIG. 1, according to this Figure, an articulated industrial robot generally designated by the reference numeral 1 having six degrees of freedom, includes a pivotable pedestal 12 mounted for pivoting movement about a vertical axis with respect to a base 17, with the pedestal 12 being connected through speed reducing means to a motor or actuator 10e. An upper arm 13, supported by the pedestal 12 for pivotal movement about a horizontal axis, is connected through speed reducing means to a motor or actuator 10b. A forearm 14, supported at a forward end of the upper arm 13 for rotation about a horizontal axis, connected through a parallel linkage to an output shaft, connected through speed reducing means, to a motor or actuator 10a. A first wrist member 15, connected to a forward end of the forearm 14 with two degrees of freedom, is connected through a parallel linkage to output shafts connected through speed reducing means to motors or actuators 10c, 10d supported on the pedestal 12. A second wrist member 16, connected to a forward end of the first wrist member 15 with one degree of freedom, is connected through shafts and gears to an output shaft connected through speed reducing means to a motor or actuator 10f supported on the forearm 14. A hand 2 is mounted on a forward end of the second wrist member 16 for gripping an article. As can be readily appreciated the industrial robot in which the control method according to the invention applies is not limited to the specific type of industrial robot shown in FIG. 1 but may have application in any type of industrial robot.

In teaching a movement of the hand 2, the positions and velocities of the hand 2 are supplied by a teaching console 4 or the robot 1 is operated by an operation box 5 to effect positioning of the hand 2 in a predetermined position. Positions of the hand 2 are obtained through displacement sensors 11a, 11b, 11c, 11d, 11e and 11f respectively connected to the actuators 10a, 10b, 10c, 10d, 10e and 10f. In controlling the robot 1, interpolation is effected so that the distance between the positions given will be covered by an indicated velocity to obtain the position to be occupied by the hand 2 for each sampling time. The amounts of control for the actuators 10a, 10b, 10c, 10d, 10e and 10f are decided in dependence upon the obtained data.

Figure 2:
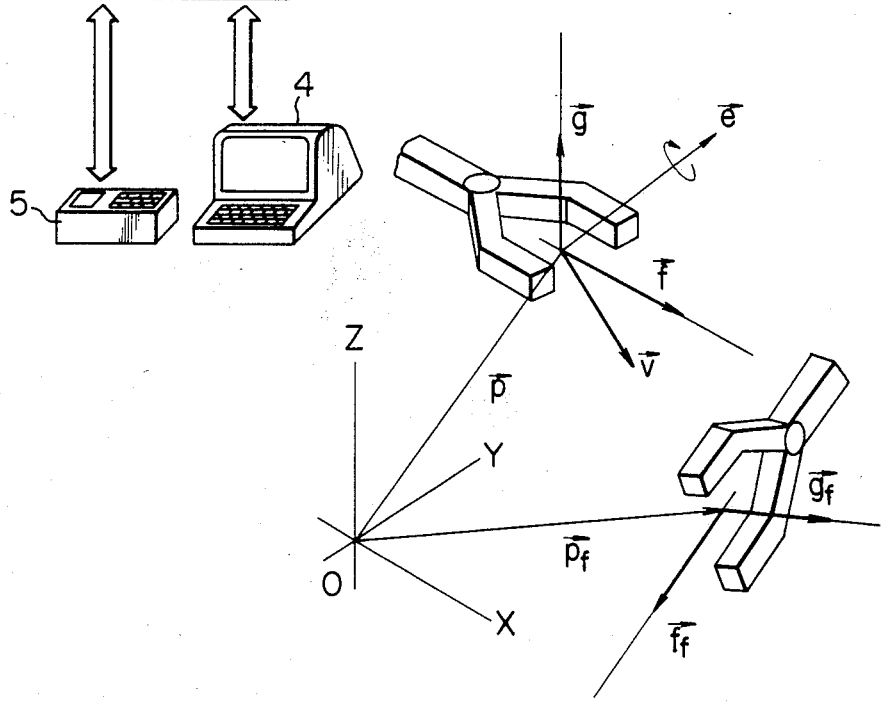
FIG. 2 is a schematic view of one example of a position and posture of the robot hand at a current point and at a target point.

With a robot having six degrees of freedom, assuming that, as shown in FIG. 2, the positions and postures of the hand 2, serving as a target, are given as a position vector $\overline{p}_f$ with respect to the fixed coordinate of the reference point of the hand 2 and as unit vectors $\overline{f}_f$ and $\overline{g}_f$ of two reference axes of the hand 2, and that the magnitude v of a translational movement of the hand 2 is indicated. The position and posture $\vec{p}, \vec{f}, \vec{g}$ of the hand 2, at a time t, are decided by displacements $\theta_1, \theta_2, \ldots \theta_6$ of the actuators 10a-10f, as follows:

$$\vec{p} = \vec{p}(\theta_1, \theta_2, \ldots \theta_6) \ldots \quad (1)$$

$$\vec{f} = \vec{f}(\theta_1, \theta_2, \ldots \theta_6) \ldots \quad (2)$$

$$\vec{g} = \vec{g}(\theta_1, \theta_2, \ldots \theta_6) \ldots \quad (3)$$

If the hand 2 moves at this time toward the target point $\vec{p}_f$ at the indicated translational velocity v, then the distance covered by the movement of the hand 2 in a sampling time interval T is as follows, when linear interpolation is performed:

$$\Delta \vec{p} = \frac{vT}{|\vec{p}_f - \vec{p}|} (\vec{p}_f - \vec{p}) \quad (4)$$

Meanwhile, a change in the posture is given by a rotation about the unit vector $\vec{e}$ which is defined by the following equations:
(i) When $\vec{f}_f = \vec{f}, \vec{g}_f = \vec{g}$, $$\vec{e} = 0 \ldots \quad (5)$$

(ii) When $\vec{f}_f = \vec{f}, \vec{g}_f \neq \vec{g}$, $$\vec{e} = \vec{f} \ldots \quad (6)$$

(iii) When $\vec{f}_f \neq \vec{f}, \vec{g}_f = \vec{g}$, $$\vec{e} = \vec{g} \ldots \quad (7)$$

(iv) When $(\vec{f}_f - \vec{f}) \times (\vec{g}_f - \vec{g}) = 0$, $$\vec{e} = (\vec{f}_f \times \vec{g}_f) \times (\vec{f} \times \vec{g}) / |(\vec{f}_f \times \vec{g}_f) \times (\vec{f} \times \vec{g})| \ldots \quad (8)$$

(v) When other condition exists, $$\vec{e} = (\vec{f}_f - \vec{f}) \times (\vec{g}_f - \vec{g}) / |(\vec{f}_f - \vec{f}) \times (\vec{g}_f - \vec{g})| \ldots \quad (9)$$

The angle of rotation $\phi$ of the hand 2 about the vector $\vec{e}$ from $\vec{f}, \vec{g}$ to $\vec{f}_f, \vec{g}_f$ is given by the following equations:

$$\phi = 2\tan^{-1} \frac{\vec{e} \cdot (\vec{f} \times \vec{f}_f)}{\vec{f} \cdot \vec{f}_f - 2(\vec{e} \cdot \vec{f})^2 + 1} \quad (10)$$

$$= 2\tan^{-1} \frac{\vec{e} \cdot (\vec{g} \times \vec{g}_f)}{\vec{g} \cdot \vec{g}_f - 2(\vec{e} \cdot \vec{g})^2 + 1}$$

Thus, the angle of rotation $\Delta \phi$ during the time interval T is given by the following equation:

$$\Delta \theta \phi = \frac{vT}{|\vec{p}_f - \vec{p}|} \theta \quad (11)$$

so that the translational velocity $\vec{v}$ and the rotational velocity $\vec{w}$ of the hand 2 have the following relationship:

$$\vec{v} = \Delta \vec{p}/T = \frac{v}{|\vec{p}_f - \vec{p}|} (\vec{p}_f - \vec{p}) \quad (12)$$

$$\vec{w} = \Delta \phi \vec{e}/T = \frac{2v\vec{e}}{|\vec{p}_f - \vec{p}|} \tan^{-1} \frac{\vec{e} \cdot (\vec{g} \times \vec{g}_f)}{\vec{g} \cdot \vec{g}_f - 2(\vec{e} \cdot \vec{g})^2 + 1} \quad (13)$$

The relationship between the velocities $\dot{\theta}_1, \dot{\theta}_2, \ldots \dot{\theta}_6$ of the actuators 10a-10f and $\vec{v}, \vec{w}$ is linear and can be expressed as follows by the Jacobian matrix J of 6×6:

$$\begin{pmatrix} \vec{v} \\ \vec{w} \end{pmatrix} = J \begin{pmatrix} \dot{\theta}_1 \\ \dot{\theta}_2 \\ \vdots \\ \dot{\theta}_6 \end{pmatrix} \quad (14)$$

From this, the velocities of the actuators 10a-10f are decided as follows:

$$\begin{pmatrix} \dot{\theta}_1 \\ \dot{\theta}_2 \\ \vdots \\ \dot{\theta}_6 \end{pmatrix} = J^{-1} \begin{pmatrix} \vec{v} \\ \vec{w} \end{pmatrix} \quad (15)$$

One has only to effect control of the actuators 10a-10f by using these values. Some of the velocities $\dot{\theta}_1, \dot{\theta}_2, \ldots \dot{\theta}_6$ of the actuators 10a-10f decided in the above-described manner may exceed the abilities of the actuators. When this is the case, a constant a, less than unity, may be applied to equation (15) to obtain the following equation:

$$\begin{pmatrix} a\dot{\theta}_1 \\ a\dot{\theta}_2 \\ \vdots \\ a\dot{\theta}_6 \end{pmatrix} = J^{-1} \begin{pmatrix} a\vec{v} \\ a\vec{w} \end{pmatrix} \quad (16)$$

so as to avoid $a\dot{\theta}_i (i=1\sim 6)$ exceeding the abilities of the actuators 10a-10f. Since $\vec{v}, \vec{w}$ are proportional to v, an operation performed in accordance with equation (16) means that the indicated velocity v has been revised to av (<v). By bringing the velocities of the actuators 10a-10f to $\dot{\theta}_i (i=1\sim 6)$, it is possible to effect control of the hand 2 of the robot 1 to move along the predetermined path of travel without the velocities exceeding the abilities of the actuators.

Figure 3:
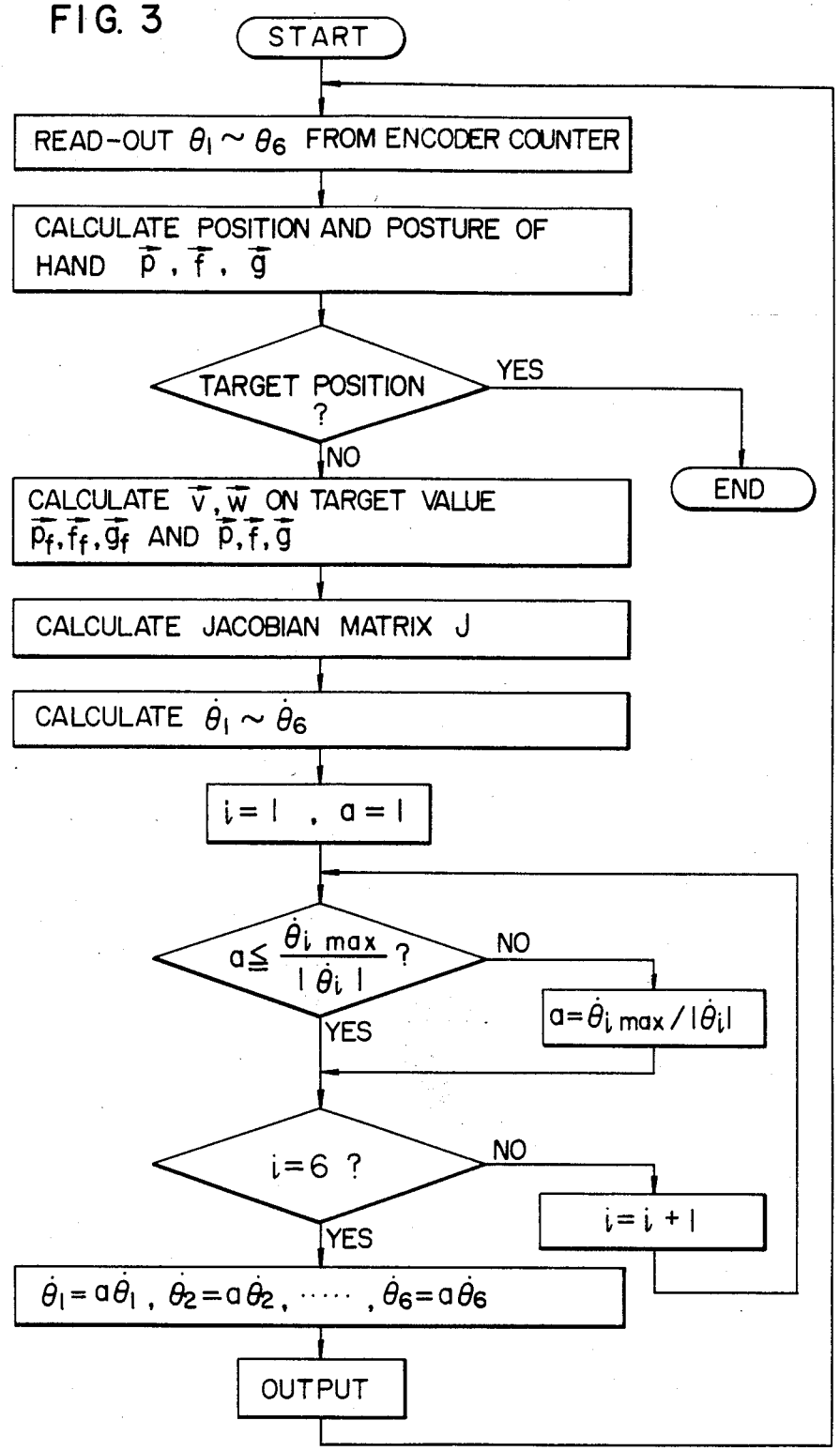
FIG. 3 is a flow chart of the control method according to the invention.

The method of control of the present invention can be shown in a flow chart shown in FIG. 3. First, a joint displacement $\theta_i$ of each actuator 10a-10f is read out from an encoder of each actuator, and the current position and posture $\vec{p}, \vec{f}, \vec{g}$ of the robot hand 2 are calculated by equations (1), (2) and (3). In the event that the current position p, f, g does not coincide with a target position $\vec{p}_f, \vec{f}_f, \vec{g}_f, \vec{v}$ and $\vec{w}$ are calculated from $\vec{p}, \vec{f}, \vec{g}, \vec{p}_f, \vec{f}_f, \vec{g}_f$ by equations (12) and (13). Then Jacobian matrix J is calculated and a velocity $\dot{\theta}_i (i=1\sim 6)$ of each actuator 10a-10f is obtained from equation (15). Each velocity is checked so that the velocity $\dot{\theta}_i (i=1\sim 6)$ of each actuator $10a$–$10f$ obtained in this way does not exceed an allowable maximum velocity $\dot{\theta}_{imax}$ ($i=1\sim6$) of each actuator. When the allowable maximum velocity is exceeded, a value less than unity is given to the constant a and the velocity $\dot{\theta}_i$ ($i=1\sim6$) is multiplied by the constant a to produce a velocity $a\dot{\theta}_i$ ($i=1\sim6$) as an output, so that the angular velocities of all the actuators $10a$–$10f$ can be brought to a level below the allowable maximum velocity $\dot{\theta}_{imax}$ ($i=1\sim6$).

The calculation described hereinabove is done by means of a control unit 6 in FIG. 1. More specifically, the joint velocity $\dot{\theta}_i$ of the robot 1 is calculated by the method of control according to the invention by means of an arithmetic unit 3 based on the current position of the hand 2 obtained by calculation from the target value given by the teaching console 4 or the operation box 5 and the joint displacement $\theta_i$ of the robot 1. The joint velocity $\dot{\theta}_i$ obtained is supplied as an output through a microprocessor 7 and interface 8 to a servo circuit 9 as a velocity instruction. The servo circuit 9 effects control of the actuator 10 mounted on a joint so that its velocity is brought to the value instructed.

In the embodiment described hereinabove, calculation has been described as being carried out by using Jacobian matrix. It is to be understood that the same calculation may be carried out to effect control of a robot by calculating a joint displacement based on the target position of the hand 2 to utilize a deviation of the joint displacement obtained by calculation from the actual joint displacement for purposes of controlling the robot. The same applies to a robot 1 having less than 5 degrees of freedom.

In effective interpolation from the current position toward the target point, an arbitrarily selected curve, such as an arc, may be used to effect interpolation. When the velocity of the hand 2 moving along the path of its travel can be calculated as a function of the target point as by arc interpolation as expressed by equations (12) and (13), the method of control according to the invention can be used as it is.

From the foregoing description, it will be appreciated that the invention enables the velocity of the hand 2 of the robot 1 to be revised in conformity with the ability of the actuators $10a$–$10f$ compared with the prior art in which, when an indicated velocity for driving an actuator exceeds the ability of the actuator, a decision is given that an error has been committed and operation of the robot has been rendered impossible.

What we claim is:

1. A method of controlling an industrial robot for moving a hand of the robot along a predetermined path of travel the method comprising the steps of:

reading a present displacement of each of a plurality of actuators for moving the hand;

calculating, at present time, a present position vector $\vec{p}$ indicating a present position of the hand and present posture unit vectors $\vec{f}, \vec{g}$ indicating a present posture of the hand based on the present displacements of the actuators;

providing a sampling time interval T for controlling the hand;

providing a projected translational distance d to be covered by the hand during the sampling time interval T;

providing a target position vector $\vec{p_f}$ indicating a target position of the hand and target posture unit vectors $\vec{f_f}, \vec{g_f}$ indicating target posture of the hand;

calculating an estimated translational vector $\vec{\Delta p}$ indicating an estimated translational movement of the hand from the present position toward the target position during the sampling time interval T, an estimated rotation unit vector $\vec{e}$ indicating an axis of rotation of the hand from the present posture toward the target posture and an estimated rotation angle $\Delta\phi$ of the hand around the rotation unit vector $\vec{e}$ from the present posture toward the target posture during the sampling time interval T, by the following relationships;

$$\vec{\Delta p} = \frac{d}{|\vec{p_f} - \vec{p}|} (\vec{p_f} - \vec{p})$$

$$\vec{e} = (\vec{f_f} - \vec{f}) \times (\vec{g_f} - \vec{g})/|(\vec{f_f} - \vec{f}) \times (\vec{g_f} - \vec{g})|$$

$$\Delta\phi = \frac{2d}{|\vec{p_f} - \vec{p}|} \tan^{-1} \frac{\vec{e} \cdot (\vec{g} \times \vec{g_f})}{\vec{g} \cdot \vec{g_f} - 2(\vec{e} \cdot \vec{g})^2 + 1}$$

calculating a command velocity of each of the actuators based on the estimated translational vector $\vec{\Delta p}$, estimated rotation unit vector $\vec{e}$ and estimated rotation angle $\Delta\phi$;

calculating a revised command velocity of each of the actuators by reducing the command velocity of each of the actuators by a same rate so that any one of the revised command velocities of the actuators does not exceed a predetermined maximum allowable velocity of a concerned actuator; and driving each of the actuators with the revised command velocity.

2. A method of controlling an industrial robot as claimed in claim 1, wherein the step of calculating a command velocity of each of the actuators comprises the steps of:

providing a Jacobian matrix to be used in calculating translational and rotational velocities of the hand based on velocities of the actuators;

calculating an estimated translational velocity vector $\vec{v}$ indicating an estimated velocity of a translational movement of the hand from the present position toward the target position and a rotational velocity vector w indicating an estimated velocity of a rotational movement of the hand from the present posture toward the target posture, by the following relationships:

$$\vec{v} = \vec{\Delta p}/T, \quad \vec{w} = \Delta\phi \vec{e}/T,$$

and calculating the command velocity of each of the actuators based on the estimated translational and rotational velocities $\vec{v}, \vec{w}$ of the hand by using an inverse matrix of said Jacobian matrix.

3. A method of controlling an industrial robot as claimed in claim 1, wherein said step of calculating a command velocity of each of the actuators comprises the steps of:

calculating an estimated position vector $\vec{p'}$ and estimated posture unit vectors $\vec{f'}, \vec{g'}$ indicating an estimated position and an estimated posture of the hand after the sampling time interval T by the following relationships:

$$\vec{p'} = \vec{p} + \vec{\Delta p}, \quad (\vec{f'}, \vec{g'}) = \Delta\phi \vec{e} \times (\vec{f}, \vec{g}),$$

calculating estimated displacements of the actuators after the sampling time interval T based on the estimated position vector $\vec{p'}$ estimated posture unit vectors $\vec{f'}, \vec{g'}$;

calculating, for each of the actuators, a difference between the estimated displacement and the present displacement; and calculating the command velocity of each of the actuators by dividing said difference by the sampling time interval T.

4. A method of controlling an industrial robot as claimed in claim 1, wherein said step of providing a projected translational distance comprises the steps of:

providing a projected translational velocity v of the hand; and calculating the projected translational distance d by multiplying the projected translational velocity v by the sampling time interval T.

5. An apparatus for controlling an industrial robot so that a hand provided of the robot moves along a predetermined path of travel, the apparatus comprising:

means for reading a present displacement of each of a plurality of actuators for moving the hand;

means for calculating, at present time, a present position vector $\vec{p}$ indicating a present position of the hand and present posture unit vectors $\vec{f}, \vec{g}$ indicating a present posture of the hand based on the present displacements of the actuators;

means for providing a sampling time interval T for controlling the hand;

means for providing a projected translational distance d to be covered by the hand during the sampling time interval T;

means for providing a target position vector $\vec{p_f}$ indicating a target position of the hand and target posture unit vectors $\vec{f_f}, \vec{g_f}$ indicating a target posture of the hand;

means for calculating an estimated translational vector $\vec{\Delta p}$ indicating an estimated translational movement of the hand from the present position toward the target position during the sampling time interval T, an estimated rotation unit vector $\vec{e}$ indicating an axis of rotation of the hand from the present posture toward the target posture and an estimated rotation angle $\Delta\phi$ of the hand around the rotation unit vector e from the present posture toward the target posture during the sampling time interval T, by the following relationships:

$$\vec{\Delta p} = \frac{d}{|\vec{p_f} - \vec{p}|} (\vec{p_f} - \vec{p})$$

$$\vec{e} = (\vec{f_f} - \vec{f}) \times (\vec{g_f} - \vec{g})/|(\vec{f_f} - \vec{f}) \times (\vec{g_f} - \vec{g})|$$

$$\Delta\phi = \frac{2d}{|\vec{p_f} - \vec{p}|} \tan^{-1} \frac{\vec{e} \cdot (\vec{g} \times \vec{g_f})}{\vec{g} \cdot \vec{g_f} - 2(\vec{e} \cdot \vec{g})^2 + 1}$$

means for calculating a command velocity of each of the actuators based on the estimated translational vector $\vec{\Delta p}$, estimated rotation unit vector $\vec{e}$ and estimated rotation angle $\Delta\phi$;

means for calculating a revised command velocity of each of the actuators by reducing the command velocity of each of the actuators by a same rate so that any one of the revised command velocities of the actuators does not exceed a predetermined maximum allowable velocity of a concerned actuator; and means for driving each of the actuators with the revised command velocity.

6. An apparatus for controlling an industrial robot as claimed in claim 5, wherein said means for calculating a command velocity of each of the actuators comprises:

means for providing a Jacobian matrix to be used in calculating translational and rotational velocities of the hand based on velocities of the actuators;

means for calculating an estimated translational velocity vector $\vec{v}$ indicating an estimated velocity of a translational movement of the hand from the present position toward the target position and a rotational velocity vector $\vec{w}$ indicating an estimated velocity of a rotational movement of the hand from the present posture toward the target posture, by the following relationships:
$\vec{v} = \vec{\Delta p}/T, \vec{w} = \Delta\phi \vec{e}/T,$ and means for calculating the command velocity of each of the actuators based on the estimated translational and rotational velocities $\vec{v}, \vec{w}$ of the hand by using an inverse matrix of said Jacobian matrix.

7. An apparatus for controlling an industrial robot as claimed in claim 5, wherein said means for calculating a command velocity of each of the actuator means comprises:

means for calculating an estimated position vector $\vec{p'}$, and estimated posture unit vectors $\vec{f'}, \vec{g'}$ indicating an estimated position and an estimated posture of the hand after the sampling time interval T by the following relationships:

$$\vec{p'} = \vec{p} + \vec{\Delta p}, (\vec{f'}, \vec{g'}) = \Delta\phi \vec{e} \times (\vec{f}, \vec{g})$$

means for calculating estimated displacements of the actuators after the sampling time interval T based on the estimated position vector $\vec{p'}$ and estimated posture unit vectors $\vec{f'}, \vec{g'}$;

means for calculating, for each of the actuators, a difference between the estimated displacement and the present displacement; and means for calculating the command velocity of each of the actuators by dividing said difference by the sampling time interval T.

8. An apparatus for controlling an industrial robot as claimed in claim 5 wherein said means for providing a projected translational distance comprises:

means for providing a projected translational velocity v of the hand; and means for calculating the projected translational distance d by multiplying the projected translational velocity v by the sampling time interval T.

* * * * *